United States Patent [19]

Pichl

[11] 4,015,429

[45] Apr. 5, 1977

[54] OUTBOARD MOTOR FOR REDUCING EXHAUST GAS POLLUTANTS

[75] Inventor: Heinz Pichl, Uppsala, Sweden

[73] Assignee: AB Volvo Penta, Goteborg, Germany

[22] Filed: Sept. 29, 1975

[21] Appl. No.: 617,653

Related U.S. Application Data

[63] Continuation-in-part of Ser. No. 507,870, Sept. 20, 1974, abandoned, which is a continuation of Ser. No. 290,698, Sept. 20, 1972, abandoned.

[30] Foreign Application Priority Data

Sept. 20, 1971 Sweden .......................... 11843/71

[52] U.S. Cl. .................................. 60/298; 60/307; 60/310; 60/314; 115/73

[51] Int. Cl.² ............................................ F01N 3/10

[58] Field of Search ............ 60/298, 310, 307, 308, 60/320, 321, 314, 303; 115/0.5 E, 17

[56] References Cited

UNITED STATES PATENTS

| | | | |
|---|---|---|---|
| 2,858,667 | 11/1958 | Reske | 60/320 |
| 3,310,022 | 3/1967 | Kollman | 60/310 |
| 3,438,198 | 4/1969 | Bentele | 60/298 |
| 3,520,270 | 7/1970 | Miller | 60/314 |
| 3,590,579 | 7/1971 | Takahashi | 60/303 |
| 3,630,032 | 12/1971 | Grainger | 60/298 |
| 3,656,303 | 4/1972 | La Force | 60/298 |
| 3,710,575 | 1/1973 | Lamm | 60/298 |

*Primary Examiner*—Douglas Hart
*Attorney, Agent, or Firm*—Toren, McGeady and Stanger

[57] ABSTRACT

In an outboard motor having an engine located above the water level, a lower unit is provided extending downwardly from the engine and includes an exhaust gas tube within the lower unit with its lower end positioned below the water level. Laterally enclosing the exhaust gas tube is a liquid jacket and a heat insulating jacket is positioned between the exhaust gas tube and the liquid jacket for maintaining the temperature of the exhaust gases at a level such that an afterburning of any oil residue in the exhaust gases is achieved before the gases are discharged from the exhaust gas tube.

6 Claims, 1 Drawing Figure

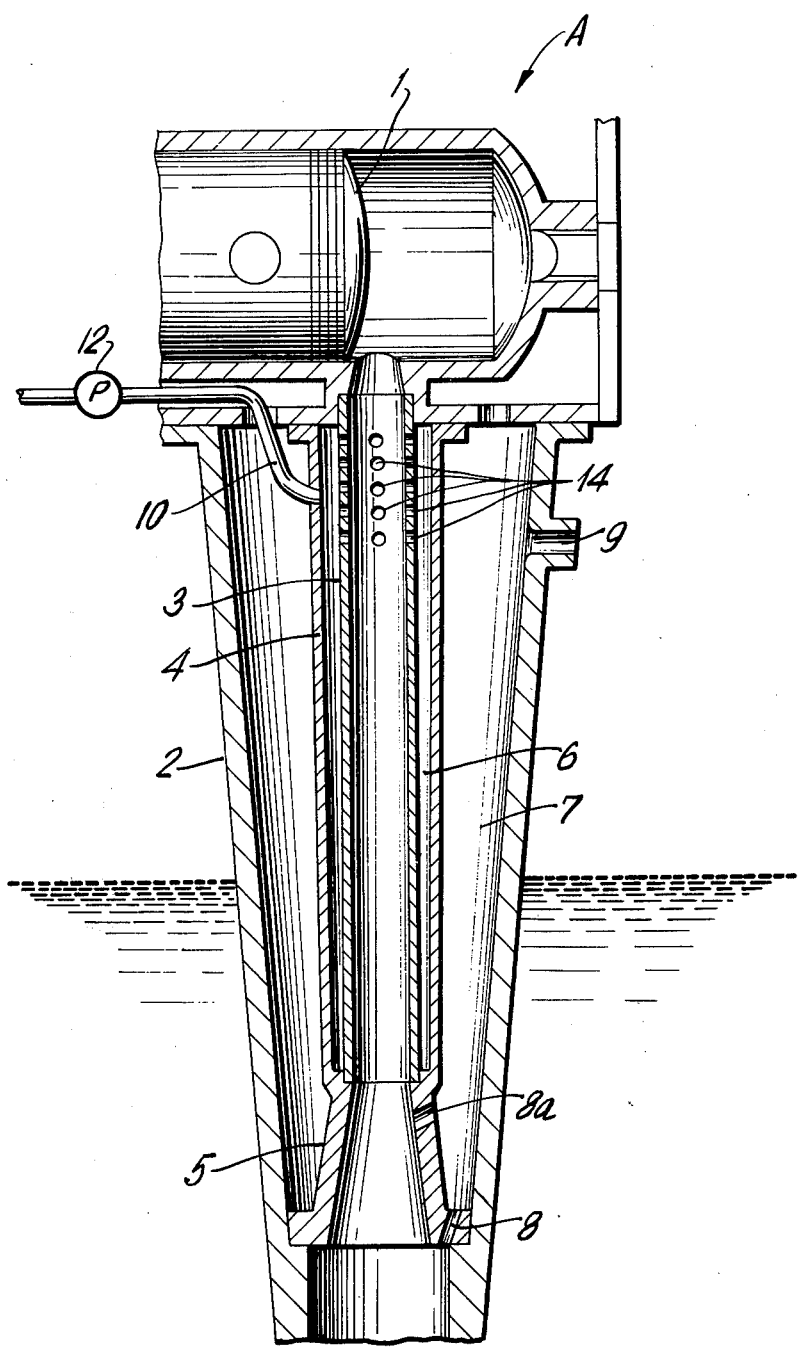

OUTBOARD MOTOR FOR REDUCING EXHAUST GAS POLLUTANTS

This application is a continuation-in-part of application Ser. No. 507,870 filed Sept. 20, 1974, now abandoned, which was a continuation of application Ser. No. 290,698 filed Sept. 20, 1972, now abandoned.

SUMMARY OF THE INVENTION

The present invention is directed to an outboard motor with its engine located above the water level and with a lower unit incorporating the exhaust gas tube extending downwardly from the engine to a point below the water level and in addition the lower unit includes an insulating jacket laterally enclosing at least a portion of the exhaust gas tube and a water jacket laterally enclosing the insulating jacket.

Outboard motors have been known, for instance as disclosed in the Swedish Pat. specification No. 331433, in which a cooling jacket directly surrounds the exhaust gas tube so that the cooling jacket containing water affords an insulation against vibrations caused by the exhaust gases flowing through the exhaust tube from the engine for providing a more silent and vibration free operation and, in addition, this arrangement reduces the temperature of the exhaust gases flowing through the exhaust gas tube.

It is an object of the present invention to retain the insulating effect against vibration afforded in the prior art while providing an arrangement in which the temperature of the exhaust gases is maintained at a high level within the exhaust gas tube so that an afterburning of any oil residues is obtained in the exhaust gas tube for providing cleaner exhaust gases.

In known two-stroke engines, oil is not burnt but exits from the exhaust gas tube in a paste-form residue. If there is a considerable cooling action in the exhaust gas tube on the unburnt oil there is less likelihood that it will be transformed into a paste-form residue and it will leave the tube in the unburned condition and be directly discharged into the water. The extent to which the unburned oil is discharged into the water is increased if, as in certain outboard motors, water is supplied to the exhaust gas tube. In accordance with regulations which have recently come into force, the discharge of oil from operating outboard motors is not permitted.

In accordance with the present invention it has been possible to obtain considerably cleaner exhaust gases from an outboard motor and, at the same time, to provide an excellent insulating effect against the vibration caused by the exhaust gases.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The drawing is a vertical sectional view of an outboard motor embodying the present invention.

DETAILED DESCRIPTION OF THE INVENTION

In the drawing an outboard motor A is shown having its engine 1 located above the water level with a lower unit 2 connected to and extending downwardly from the engine to a point below the water level. The water level is shown at its approximate location when a boat using the outboard motor A is running, when the boat is not running its location is lower than shown. Within the lower unit 1, an exhaust gas tube 3 is connected at its upper end to the engine and extends downwardly to a point below the water level. Preferably, the exhaust gas tube is formed of stainless steel for its resistance to high gas temperatures. Also within the lower unit is a tube 4 which laterally encloses a major portion of the length of the exhaust gas tube. At its lower end the tube 4 is connected to the exhaust gas tube 3 and a frusto-conically shaped member 5 extends downwardly below the point of connection between the tubes 3 and 4 forming an extension of the exhaust gas tube. The frusto-conically shaped member 5 through which the exhaust gases flow provides an effect increasing device as described in U.S. Pat. No. 3,520,270 to Miller. The tube 4 laterally encloses the exhaust gases for a major portion of their length of flow through the lower unit 2 and forms a heat insulating air pocket 6 therebetween. The height of the air pocket 6 is as long as possible in relation to the exhaust gas tube 3. The wall defining the lower unit 2 in combination with the outer surface of the tube 4 forms a liquid jacket or space 7 laterally enclosing the tube 4 and the frusto-conical member 5. When the outboard motor A is in use, water is supplied into the liquid jacket 7 through an inlet opening 8 at the lower end of the member 5 and an overflow opening 9 is provided adjacent the upper end of the lower unit 2 for limiting the water level within the jacket 7. The lower unit 2 terminates a short distance below the inlet opening 8. As is well known, such as in motorcycles, it is possible to tune the torque point and RPM of a two-stroke engine by varying the length and the shape of the exhaust gas tube. The exhaust gas tube dimensions are individual for each engine type.

In the frusto-conical member 5 above the inlet opening 8 another opening 8a is provided to reduce the exhaust gas resistance when starting the engine. This opening 8a is located, as high as possible, in the exhaust gas tube, preferably above the water level when the boat is not running. When the boat is running the water level is higher, as it is shown in the drawing.

The temperature of the exhaust gases leaving the engine is about 700° C and if the temperature of the exhaust gases within the tube 3 is maintained at a sufficiently high level there will be, for instance, in two-stroke engines, a complete burning or afterburning of the oil contained in the exhaust gases. A good oil used in a two-stroke engine has a high flash-point of about 300° C and its ashing range is not higher than 525° – 550° C. Accordingly, if the exhaust gases within the tube 3 are properly insulated and maintained as close as possible to the outlet temperature of 700° C from the engine the oil will burn in the exhaust gas tube but will leave hardly any ash. Accordingly, it is the purpose of the present invention to afford the insulation of the axial length of the exhaust gas tube in which burning of the oil will take place at a sufficiently high temperature to assure that the burning will be carried out effectively without any appreciable residue remaining.

To improve the afterburning effect within the exhaust gas tube 3 air is directed into the insulating air jacket 6 through a pipe 10 from an air pump 12 and then passes through the perforations 14 in the upper end of the tube 3 for mixture with the exhaust gases so that combustion of any unburnt components within the exhaust gases can be effected within the axial length of the tube 3, that is, before the exhaust gases pass out of the range of the heat insulating air jacket 6. The perforations 14 are placed as near the inlet end of the exhaust gas tube 3 as possible. The number and size of the perforations is dependent on the engine size (exhaust gas volume). It is not necessary to pump heated air into the insulating air pocket 6. When air is pumped into the tube 3, its oxygen mixes with the oil and gasoline gases existing as residues in the exhaust gases. The introduction of the oxygen causes an afterburning which increases the temperature in the tube 3.

As can be noted in the drawing, the air affording the insulating effect within the jacket 6 enters the jacket near the upper end. The wall of the tube 4 has a reduced diameter in the downwardly extending direction so that the space between it and the cylindrically shaped tube 3 decreases in the downward direction. However, a uniform spacing between tube 4 and tube 3 for the height of the space 6 could be useful with similar insulating efficiency. Furthermore, the air supplied into the jacket 6 from the pump 12 is heated to the desired temperature so that it affords the proper insulating effect between the exhaust gas tube 3 and the liquid jacket 7. The perforations 14 which supply the heated air into the exhaust gas tube 3 are located at the inlet end of the tube to afford the maximum mixing effect with the unburned components in the exhaust gases to assure adequate afterburning within the exhaust gas tube.

Notwithstanding the advantage of good exhaust gas burning, it is possible to maintain the exhaust gas tube as an effect tube and also to maintain the use of the vibration damping liquid jacket 7. The outboard motor arrangement described above can, of course, be used for both two-stroke and four-stroke engines of conventional type or of the rotary piston type.

While a specific embodiment of the invention has been shown and described in detail to illustrate the application of the inventive principles, it will be understood that the invention may be embodied otherwise without departing from such principles.

What is claimed is:

1. An outboard motor comprising an engine arranged to be located above the water level, a generally vertically extending exhaust gas tube having an upper end and a lower end with the upper end connected to said engine and said exhaust gas tube and extending downwardly from the engine with its lower end positioned below the water level, a tubular shaped wall laterally enclosing and spaced outwardly from said exhaust gas tube and extending for the axial length of said exhaust gas tube and forming an annular space about said exhaust gas tube with the upper and lower ends of the annular space being closed, a tubular member located within the annular space and laterally enclosing said exhaust gas tube for at least a major portion of the axial length of the said exhaust gas tube from the upper end toward the lower end thereof, said tubular member spaced radially outwardly from said exhaust gas tube and the lower end of said tubular member being connected to said exhaust gas tube, said tubular member being spaced radially inwardly from said tubular shaped wall and dividing said annular space into an inner annular insulating space between said exhaust gas tube and said tubular member from the upper end of said tubular member to the location of its connection to said exhaust gas tube with the insulating space being closed at its upper and lower ends, and an outer annular space laterally enclosing said insulating space for the axial length thereof, means for circulating a liquid through said outer annular space, and means for supplying air into said inner annular insulating space and for directing air from said inner annular insulating space into said exhaust gas tube adjacent the upper end thereof for supplying oxygen into said exhaust gas tube for aiding in the combustion of unburned components in the exhaust gases within said exhaust gas tube.

2. An outboard motor, as set forth in claim 1, wherein the lower end of said exhaust gas tube extends downwardly from the lower end of said tubular member and has a frusto-conical configuration diverging in the downward direction from the lower end of said tubular member.

3. An outboard motor, as set forth in claim 1, wherein said exhaust gas tube at least for its axial length within said tubular member is formed of a material resistant to high exhaust gas temperatures.

4. An outboard motor, as set forth in claim 3, wherein said material resistant to high exhaust gas temperatures is stainless steel.

5. An outboard motor, as set forth in claim 1, wherein said means for circulating a liquid through said annular cooling space comprises an opening in the lower end of said exhaust gas tube into said outer annular space and another opening through said wall located near and below the upper end of said outer annular space for flowing a liquid upwardly therethrough.

6. An outboard motor, as set forth in claim 1, wherein said means for supplying air into said inner annular insulating space and for directing the air from said inner annular insulating space into said exhaust gas tube comprises a duct connected at one end to said tubular member adjacent its upper end and extending outwardly from said tubular member, an air pump mounted in said duct at a position spaced outwardly from said tubular member and arranged for conveying air into said inner annular insulating space, and said exhaust gas tube having perforations therethrough in its range adjacent its upper end opening into the upper end of said inner annular insulating space.

* * * * *

UNITED STATES PATENT OFFICE
CERTIFICATE OF CORRECTION

Patent No. 4,015,429　　　　　　　　　Dated April 5, 1977

Inventor(s) Heinz Pichl

It is certified that error appears in the above-identified patent and that said Letters Patent are hereby corrected as shown below:

In the heading of the patent [73] should read as follows:

-- [73] Assignee:
AB Volvo Penta, Göteborg, Sweden--.

Signed and Sealed this

Twenty-eighth Day of June 1977

[SEAL]

Attest:

RUTH C. MASON
*Attesting Officer*

C. MARSHALL DANN
*Commissioner of Patents and Trademarks*